(12) United States Patent
Pratt et al.

(10) Patent No.: US 6,483,634 B1
(45) Date of Patent: Nov. 19, 2002

(54) OPTICAL AMPLIFIER

(75) Inventors: Andrew R Pratt, Bristol (GB); Kozo Fujii, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 137 days.

(21) Appl. No.: 09/662,904

(22) Filed: Sep. 15, 2000

(30) Foreign Application Priority Data

Jan. 12, 2000 (JP) ........................................ 2000-003210

(51) Int. Cl.[7] .................................................. H01S 3/00
(52) U.S. Cl. .................................................. 359/341.41
(58) Field of Search ........................ 359/341.41, 341.4

(56) References Cited

U.S. PATENT DOCUMENTS

| | | | |
|---|---|---|---|
| 5,245,690 A | * 9/1993 | Aida et al. ................... | 385/142 |
| 6,008,935 A | * 12/1999 | Fujita et al. ................. | 359/341 |
| 6,259,553 B1 | * 7/2001 | Kinoshita .................... | 359/337 |
| 6,337,764 B1 | * 1/2002 | Yoon et al. ............. | 359/341.41 |

* cited by examiner

*Primary Examiner*—Mark Hellner
(74) *Attorney, Agent, or Firm*—Venable; Michael A. Sartori; Jeffrey W. Gluck

(57) ABSTRACT

This invention provides an improved optical amplifier, which comprises a rare earth doped optical fiber for amplifying the optical signal, at least one pump laser for providing a pump signal to the rare earth doped optical fiber, a wavelength division multiplexer for extracting a backward amplified spontaneous emission (ASE) signal in the C-band wavelength (1525–1565 nm) differ from the L-band wavelength (1565–1610 nm) containing the optical signal to be transmitted, a gain controller for controlling a power level of the pump signal based on a received power of the backward ASE signal.

20 Claims, 8 Drawing Sheets

US 6,483,634 B1

OPTICAL AMPLIFIER

BACKGROUND OF THE INVENTION

1. Field of the Invention

The present invention generally relates to optical amplifiers, and more specifically relates to rare earth doped fiber amplifiers for amplifying optical signals by providing a pump signal.

2. Description of the Related Art

In general, rare earth doped fiber amplifiers such as erbium doped fiber amplifiers have been used for optical communication systems. In erbium doped fiber amplifiers, it is well known that an amplified optical signal can be obtained by providing to the erbium doped fiber a pump signal having a shorter wavelength than that of the optical signal to be transmitted. Furthermore, the pump power of the pump signal can be adjusted automatically by monitoring an amplified spontaneous emission (ASE) signal. However, when monitoring the forward propagating ASE signal, conventional gain control methods require a complicated extracting means, such as Fiber Bragg Gratings (FBG) or Array Waveguide Gratings (AWG) to extract the forward ASE signal from the amplified optical signal. On the other hand, when monitoring the backward propagating ASE signal, since a backward ASE signal with enough power can not be obtained, complicated control techniques are needed to control the pump power based on such weak backward ASE powers.

As a result, conventional erbium doped fiber amplifiers each provided with a gain controller for performing the conventional gain control methods mentioned above would become larger and more complicate as the number of channels in a density multiplexed input signal increase. It is thus desired to establish a simple gain controller for controlling the gain of rare earth doped fiber amplifiers.

SUMMARY OF THE INVENTION

It is an object of the present invention to provide an improved optical amplifier with a simple gain controller.

It is another object of the present invention to provide an improved rare earth doped fiber amplifier with a gain controller for controlling the gain of a pump signal and a monitor coupler for monitoring an amplified spontaneous emission (ASE) signal.

In order to achieve the above object of the present invention, an optical amplifier for amplifying an optical signal, wherein the amplifier comprises:

- an input port for inputting the optical signal to be amplified,
- a rare earth doped optical fiber, coupled to said input port, for amplifying the optical signal,
- a first pump laser, coupled to said rare earth doped optical fiber, for providing a first pump signal to said rare earth doped optical fiber in the direction of the optical signal,
- a wavelength division multiplexer, coupled between said input port and said rare earth doped optical fiber, for extracting a backward traveling amplified spontaneous emission signal in a wavelength band different from a wavelength band containing the optical signal,
- a gain controller for controlling a power level of the first pump signal based on a received power of the backward traveling amplified spontaneous emission signal.

BRIEF DESCRIPTION OF THE DRAWINGS

A preferred form of the present invention is illustrated in the accompanying drawings in which.

DETAILED DESCRIPTION OF THE PREFERRED EMBODIMENTS

A. First embodiment of the invention

The first embodiment of the present invention will be described below with reference to a preferred embodiment in conjunction with the accompanying drawings.

Figure 1:
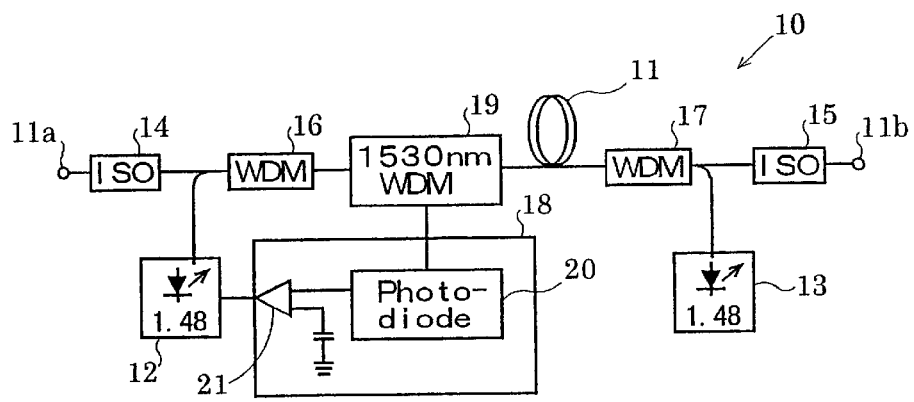
FIG. 1 is a simplified block diagram of an optical amplifier in accordance with the first embodiment of the invention.

FIG. 1 shows a simplified block diagram of an optical amplifier 10, which is provided with an input port 11a, an output port 11B, a single erbium doped fiber 11, a forward pump laser 12, a backward pump laser 13, optical isolators 14 and 15, wavelength division multiplexers (WDM) 16 and 17, a gain controller 18 and a monitoring WDM 19.

Optical signals having a L-band wavelength (1565–1610 nm) are supplied to the input port 11a of the single erbium doped fiber 11, which is doped with erbium and further co-doped with aluminum. For example, a single erbium doped fiber of 28 m is used so as to satisfy the requirement that the amplification level of the optical signals in the L-band wavelength may be approximately 16 dB. The fiber thus shows the characteristic that absorption loss around 1550 nm is 8 dB/m.

The optical isolator 14 is connected to the input terminal 11a and prohibits the optical signals from back propagating in an opposite direction to the incident optical signals. Similarly, the isolator 15 is connected to the output terminal 11b and prohibits the optical signals from back propagating in an opposite direction to the incident optical signals.

The forward pump laser 12 comprises, for example, a laser diode operable to change the output power thereof in proportion to a bias current and is coupled between the input port 11a and the single erbium doped fiber 11. The forward pump laser 12 then provides to the single erbium doped fiber 11, via the WDM 16 in a co-propagating direction with the optical signal, a forward pump signal of 1480 nm whose energy is higher than that of the optical signals in the L-band wavelength.

The backward pump laser 13 comprises, for example, a laser diode of a constant output power, and is located between the output port 11b and the single erbium doped fiber 11. The backward pump laser 13 then provides to the single erbium doped fiber 11, via the WDM 17 in a counter-propagating direction of the optical signals, a backward pump signal of 1480 nm whose energy is higher than that of the optical signal in the L-band wavelength.

When providing the forward and backward pump signals from the forward and backward pump lasers 12 and 13, the single erbium doped fiber 11 is population inverted. As a result of the stimulated emission based on the population inversion, the optical signals supplied to the input port 11a can be amplified. The amplified optical signals are thus output to a communication path (not shown) via the output port 11b.

To control the amplification factor of the optical signals in the L-band wavelength, the forward pump laser 12 changes the pump power of the forward pump signal based on the bias current. The bias current is controlled by the gain controller 18 such that the received backward ASE signal power extracted by the monitoring WDM 19 is constant. On the other hand, the backward pump laser 13 outputs a backward pump signal at a constant power.

The monitoring WDM 19 is coupled between the WDM 16 and the single erbium doped fiber 11 and extracts the backward traveling ASE signal at a C-band wavelength (1530 nm), traveling in the opposite direction to the optical signals, as a monitor signal. The backward traveling ASE signal extracted by the monitoring WDM 19 is supplied to the gain controller 18, which comprises a photo-diode 20 and a control element 21. The photo-diode 20 performs a photoelectric conversion of the backward traveling ASE signal in order to obtain an electrical signal corresponding to the received power of the backward traveling ASE signal. The control element 21 controls the bias current of the forward pump laser 12 so that the received power of the backward traveling ASE signal is fixed at a predetermined power level.

Figure 2:
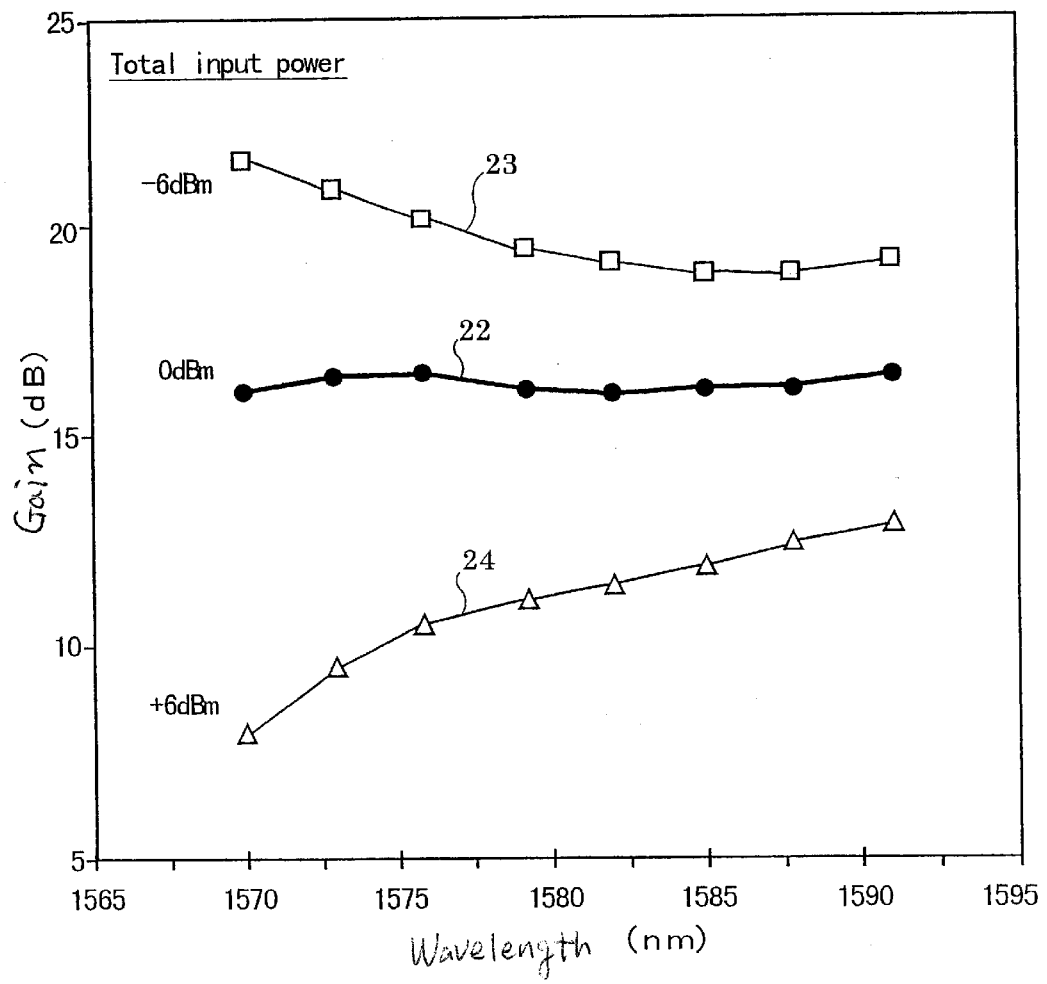
FIG. 2 is a graphical representation showing the simulated gain spectra for three input optical signals with different total input powers +6, 0, −6 dBm without feedback control operation.

FIG. 2 show simulated gain spectra for three total input powers of −6, 0 and +6 dBm with no feedback control operation and assuming eight input channels. The vertical axis indicates gain (dB) and the horizontal axis indicates an input wavelength (nm). The simulation results have been obtained on condition that the forward traveling ASE signal and the backward traveling ASE signal are adjusted to obtain a gain flattened spectra (approximately 16 dB), when the total input power of the input optical signals comprising eight multiplexed input channel is 0 dBm. In FIG. 2, the curve 22 indicates the characteristic gain spectra for an input optical signal with total input power of 0 dBm (that is, 10 mW). Curve 23 indicates the characteristic gain spectra for an input optical signal with total input power of −6 dBm. Curve 24 indicates the gain characteristic for an input optical signal with total input power of +6 dBm. As shown in FIG. 2, the gain of the optical amplifier 10 generally changes in response to the total input power of each input optical signal if the pump power of the forward pump laser 12 is maintained at a constant level.

Figure 3:
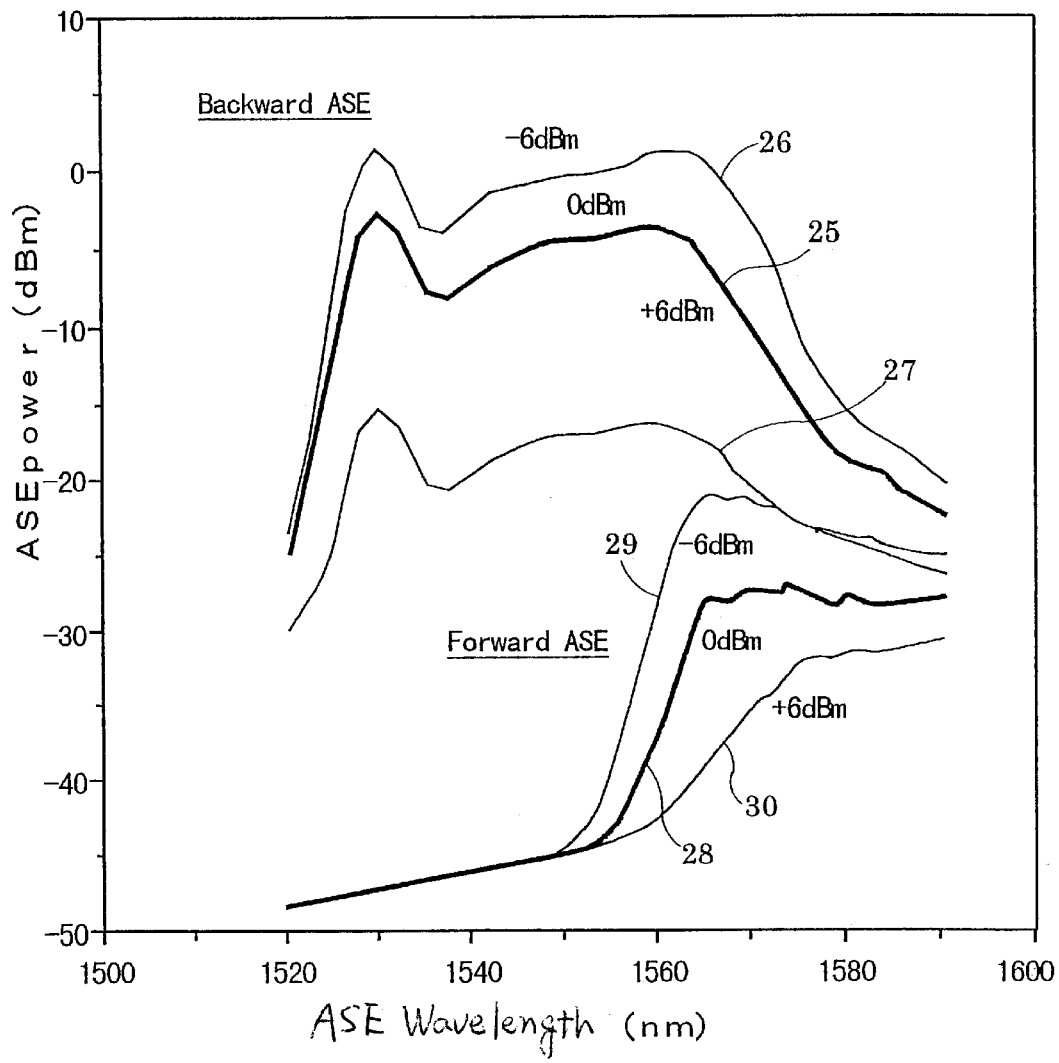
FIG. 3 is a graphical representation showing the change in the forward and backward traveling ASE powers without feedback control operation.

FIG. 3 shows changes in the forward and backward ASE power when the total input power is changed (−6, 0, +6 dBm). In FIG. 3, the curves 25, 26 and 27 indicate the ASE power of the backward traveling ASE signal for the three input signals with total input powers of −6, 0 and +6 dBm respectively. Similarly, the curves 28, 29 and 30 indicate the ASE power of the forward traveling ASE signal for the three input signals with total input powers of −6, 0 and +6 dBm respectively. As to the backward traveling ASE signal, the ASE power of the backward traveling ASE signal can be detected at relatively high power in the C-band (1525–1565 nm), in contrast to the backward travelling ASE signal in the L-band (1565–1610 nm), regardless of the input power of the input optical signals. In addition, the ASE powers of the backward traveling ASE signal are peaked around 1530 nm. On the other hand, as to the forward traveling ASE signals, the ASE powers of the forward traveling ASE signals can be also detected at relatively high power in the L-band (1565–1610 nm) overlapping with that of the input optical signal, but can not be detected at relatively high power in the C-band (1525–1565 nm) not overlapping with that of input optical signals. Consequently, the backward traveling ASE signal in the C-band is fit to use as a monitor signal in consideration of both the wavelength band and the ASE power.

Figure 4:
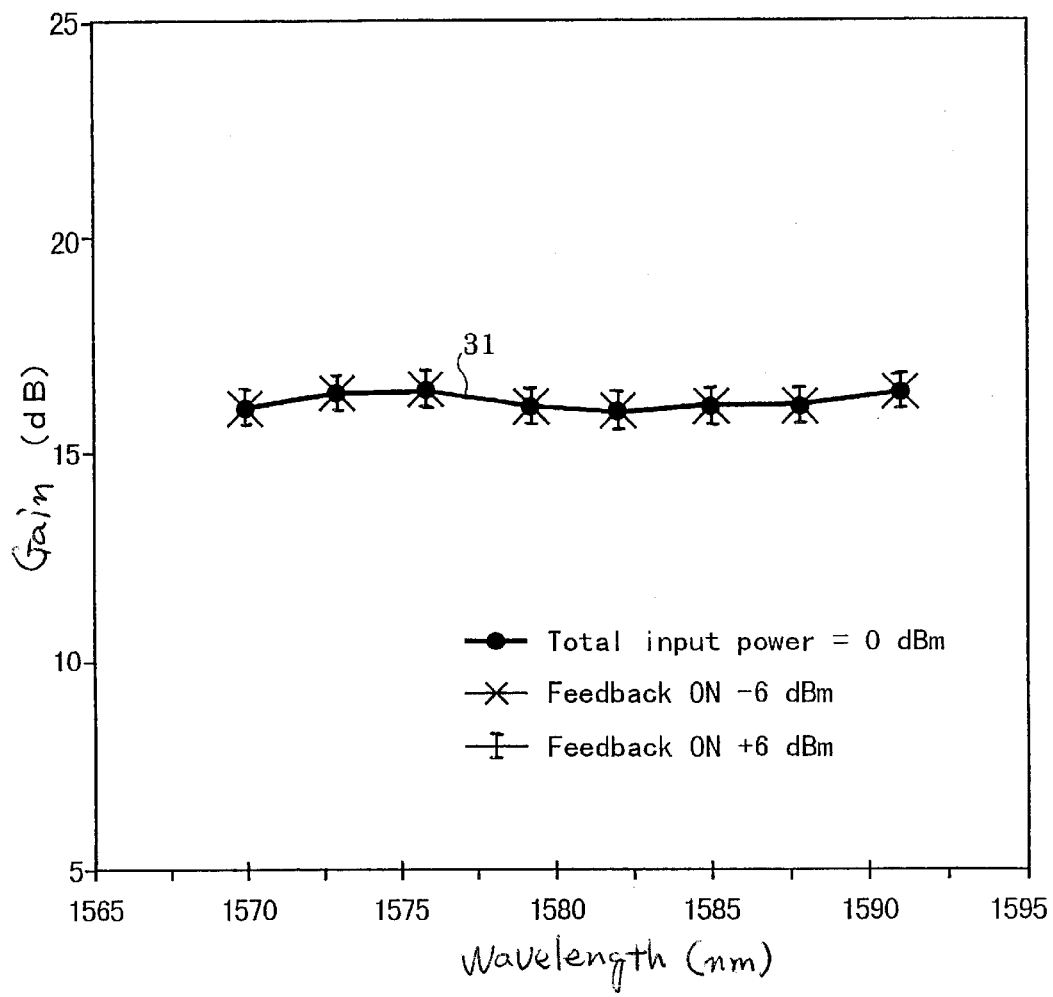
FIG. 4 is a graphical representation showing the simulated gain variation with feedback control operation in accordance with the first embodiment of the invention.

As shown in FIGS. 2 and 3, the ASE power of the backward traveling ASE signals and the gain changes over the whole wavelength band (1520–1600 nm) in response to a change of the total input power of the input optical signals. However, FIG. 4 shows that the gains spectra of the three input optical signal levels can be obtained at an identical level, without regard to the change in the total input power and the component of wavelength, by adjusting the pump power of the forward pump laser 12, such that the power of the backward traveling C-band ASE signal is constant. In FIG. 4, a black circle mark indicates the relation between the gain and the wavelength for the input optical signal with total input power of 0 dBm. A cross mark indicates the relation between the gain and the wavelength for the input optical signal with total input power of −6 dBm. An "I" shaped mark indicates the relation between the gain and the wavelength for an input optical signal with total input power of +6 dBm. As a result, based on the simulated result shown in FIG. 4, it can be understood that an unchanged gain level of the L-band erbium doped fiber amplifier can be obtained without regard to the changes in the total input powers of the input optical signals.

Figure 5:
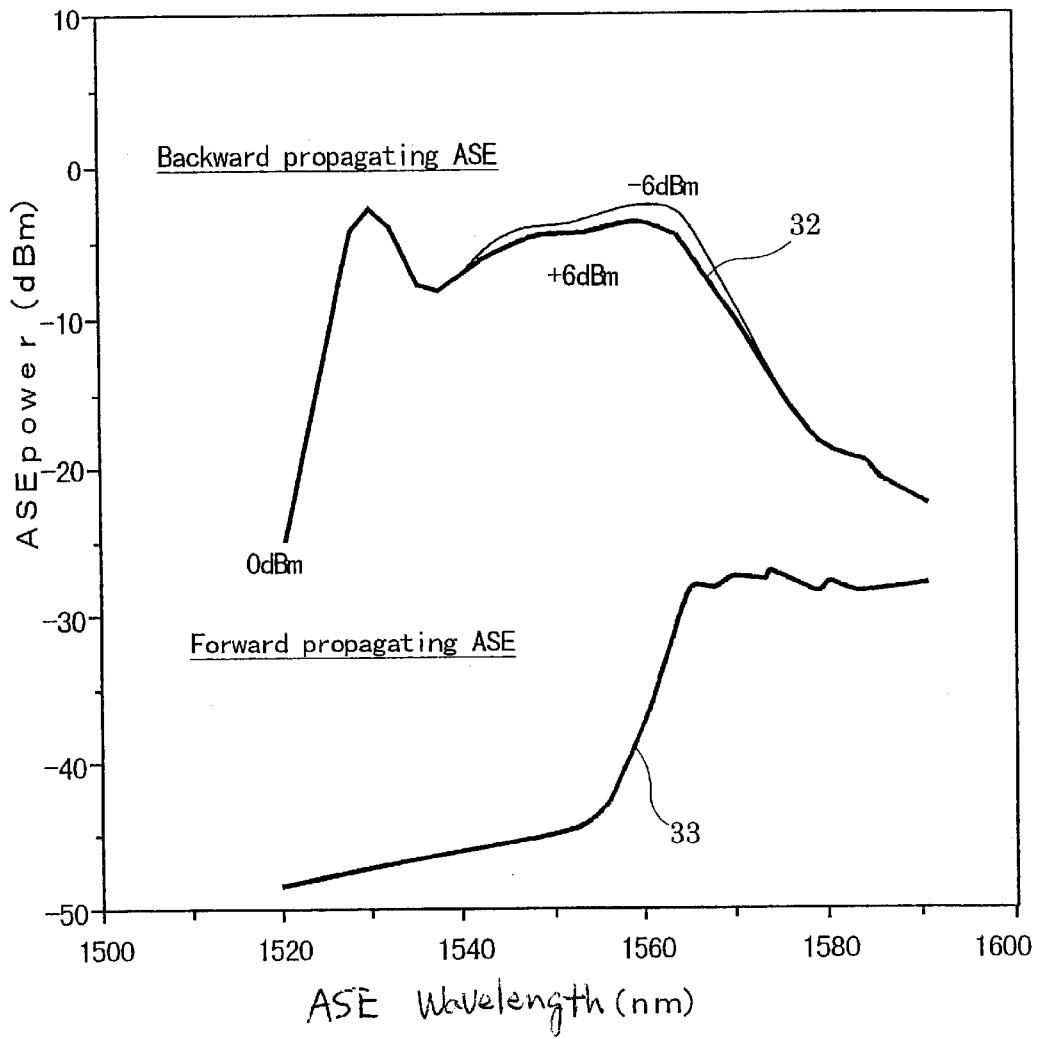
FIG. 5 is a graphical representation showing the simulated gain spectra for three input optical signals with different total input powers +6, 0, −6 dBm with feedback control operation.

FIG. 5 shows the changes in the forward and backward ASE powers when the pump power of the forward pump laser 12 is controlled such that the ASE power of the backward traveling C-band ASE signal is constant. As indicated by the curve 32, the three ASE spectra characteristics of the backward traveling ASE signals corresponding to total input powers of −6, 0 and +6 dBm coincide with each other since the ASE power characteristics do not vary in response to the changes in the input powers and the wavelengths. Similarly, the three ASE spectra characteristics of the forward traveling ASE signals corresponding to the input powers of −6, 0 and +6 dBm coincide with each other as indicated by a curve 33.

As mentioned above, since the backward traveling ASE signal in the C-band wavelength (1525–1565 nm) is monitored, the monitoring WDM 19 can detect the backward traveling ASE signal at relatively high power level, without complicated extracting means such as Fiber Bragg Gratings (FBG) or Array Waveguide Gratings (AWG). Further the gain controller 18 can easily adjust the pump power of the forward pump laser 12 so that the monitored backward traveling ASE signal in the C-band can be maintained at a predetermined power level.

B. Second embodiment of the invention

Figure 6:
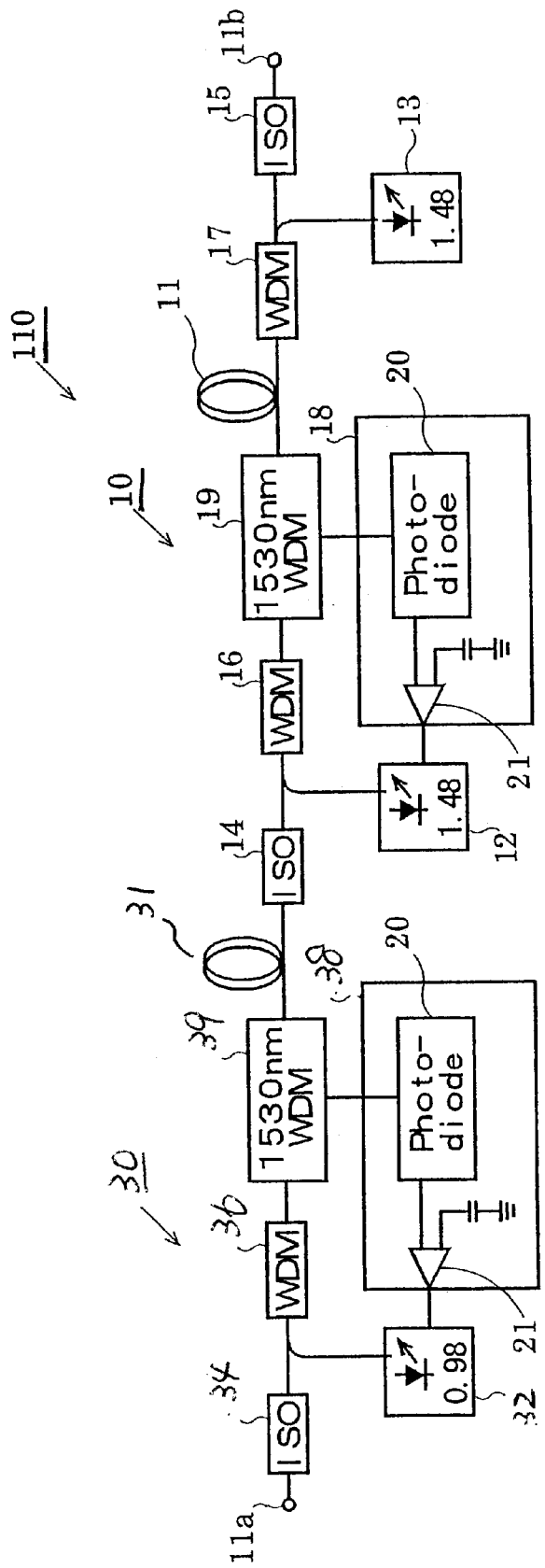
FIG. 6 is a simplified block diagram of a two stage optical amplifier in accordance with the second embodiment of the invention.

FIG. 6 shows a schematic block diagram of a two stage optical amplifier 110, where an optical amplifier 10 shown in FIG. 1 and an optical amplifier 30 are cascaded together. In general, a two stage optical amplifier is used to reduce optical noise figure without reducing the gain thereof. The first stage of the optical amplifier 110 (the optical amplifier 30) acts as a pre-amplifier for the second stage (the optical amplifier 10). The optical amplifier 110 then comprises the optical amplifier 10 and the optical amplifier 30. The structure and operation of the optical amplifier 10 are the same as the first embodiment of the invention. The optical amplifier 30 comprises an input port 11a, a single erbium doped fiber 31, a forward pump laser 32, an optical isolator 34, a wavelength division multiplexer (WDM) 36, a gain controller 38 and a monitoring WDM 39.

Referring to the two stage optical amplifier 110 in detail. Optical signals in the L-band wavelength (1565–1610 nm) are supplied to the input port 11a of the single erbium doped fiber 31 which is doped with erbium and further co-doped with aluminum. For example, for the single erbium doped fiber 31, a single erbium doped fiber of 7.8 m is used so as to satisfy the requirement that the first EDF 31 is highly inverted and the noise figure of the signal erbium doped fiber 31 is low. The fiber thus shows the characteristic that the absorption loss around 1550 nm is 2.7 dB/m.

The optical isolator 34 is connected to the input terminal 11a and prohibits the optical signals to be transmitted for propagating in the opposite direction of the input optical signals.

The forward pump laser 32 is provided with, for example, a laser diode operable to change the pump power thereof in proportion to a bias current. The forward pump laser 32 is located between the input port 11a and the single erbium doped fiber 31. The forward pump laser 32 then provides, to the single erbium doped fiber 11 via the WDM 16, a pump signal of 980 nm whose energy is higher than that of the input optical signals in the L-band wavelength (1565–1610 nm).

When providing the forward pump signal from the forward pump laser 32, the single erbium doped fiber 31 is population inverted. As a result of the stimulated emission based on the population inversion, the optical signals supplied to the input port 11a can be amplified. The amplified optical signals are thus output to the optical amplifier 10.

Referring to the feedback control operation of the optical amplifier 30. To control an amplification factor of the optical signals to be amplified, the forward pump laser 32 is provided with a laser diode that is operable to change pump power thereof in response to a bias current provided by the controller 38. The gain controller 38 then controls the bias current based on an ASE power of a backward traveling ASE signal in the C-band wavelength (1525–1565 nm).

To monitor the backward traveling ASE signal, the monitoring WDM 39 is coupled between the WDM 36 and the single erbium doped fiber 31 and extracts the backward traveling ASE signal in the C-band wavelength (1530 nm) traveling in opposite direction to the input optical signals. The backward traveling ASE signal is supplied to the controller 38 which comprises a photo-diode 20 and a control element 21. The photo-diode 20 performs a photo-electric conversion of the backward traveling ASE signal in order to obtain an electrical signal corresponding to the received power of the backward traveling ASE signal. The control element 21 controls the bias current of the forward pump laser 12 so that the received power of the backward traveling ASE signal becomes a predetermined power level.

Although the input optical signal amplified by the single erbium doped fiber 31 is supplied to the optical fiber 10, the explanation of the optical amplifier 10 is omitted here since it is the same as the first embodiment.

Figure 7:
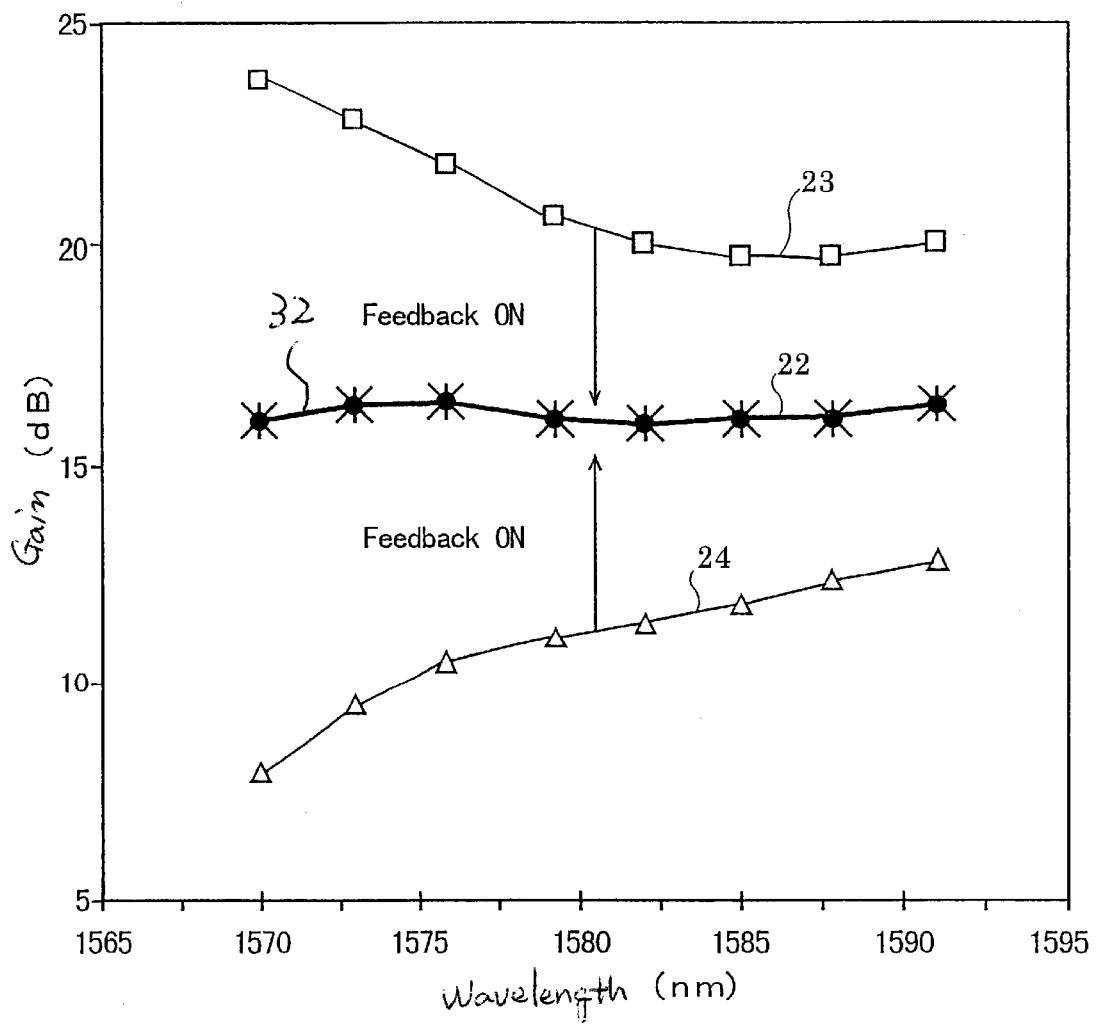
FIG. 7 is a graphical representation showing the simulated gain variation with feedback control operation in accordance with the second embodiment of the invention.
Figure 8:
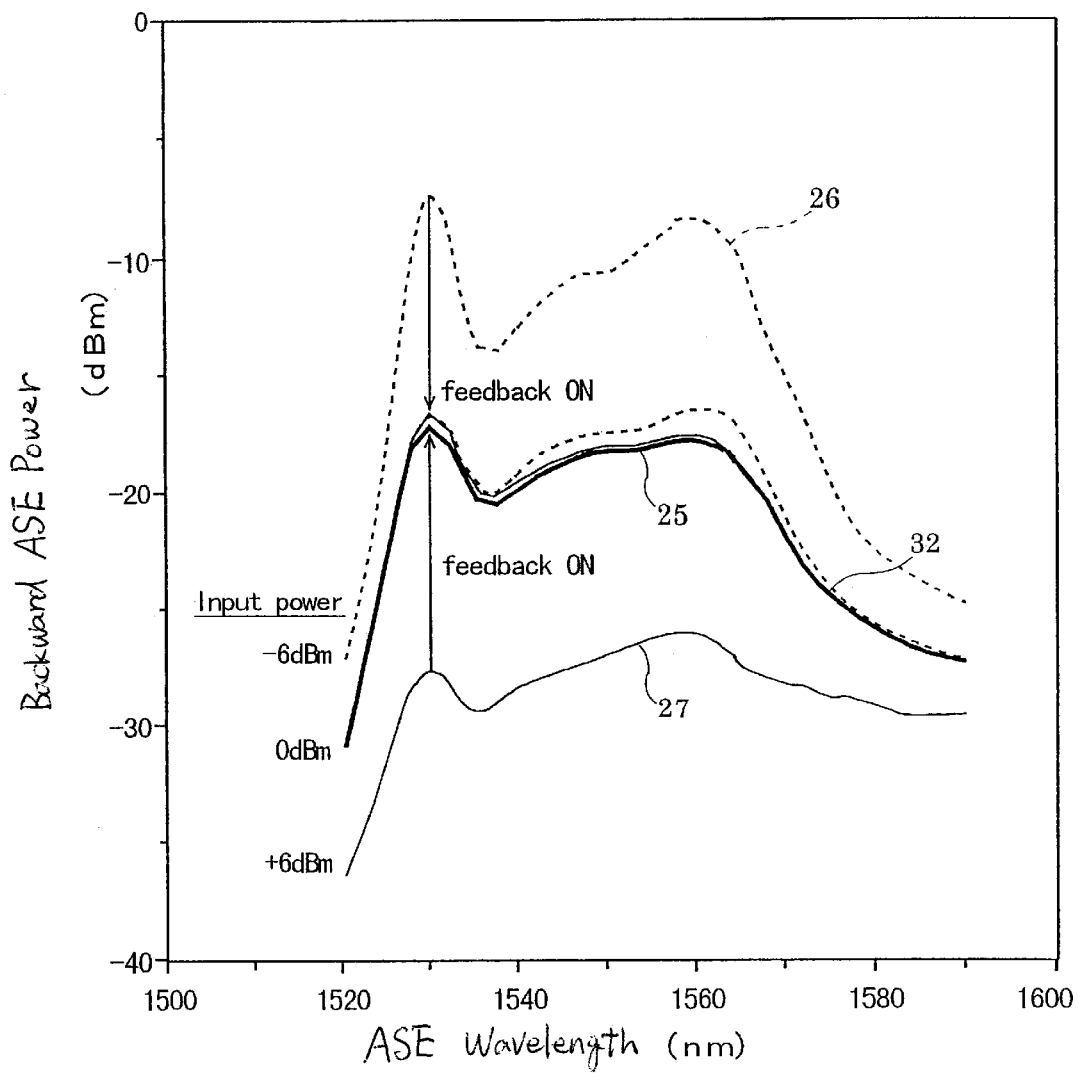
FIG. 8 is a graphical representation showing the change in the backward traveling ASE power with feedback control operation in accordance with the second embodiment of the invention.

The amplitude characteristic of the two stage optical amplifier 110 comprising the optical amplifiers 10 and 30 is almost the same as that of the first embodiment as shown in FIGS. 7 and 8. FIG. 7 shows simulated gain spectra for three total input powers of −6, 0 and +6 dBm with no feedback control operation and assuming eight input channels. In FIG. 7, curve 22 indicates the gain variation of the input optical signal with total input power of 0 dBm (that is, 10 mW). Curve 23 indicates the gain variation of the input optical signal when the total input power is −6 dBm. Curve 24 indicates the gain variation of the input optical signal when the total input power is +6 dBm. Consequently, it can be seen that the gain of the two stage optical amplifier 110 changes with the component of wavelengths when the feedback control operation is not performed and the total input power of the input optical signals change as in the first embodiment. In addition, a curve 31 overlapping with the curve 22 indicates the gain variations of the above-mentioned three input optical signal levels, with different total input powers, when the forward pump power of the forward pump lasers 12 and 32 are adjusted such that the ASE power of the backward traveling ASE signals is constant. Accordingly, it can be seen that constant gain can be obtained by controlling the ASE powers of the backward traveling ASE signals without regard to the wavelengths of the input optical signals and the change in the total input power of the input optical signal.

In FIG. 8, curves 25, 26 and 27 indicate the ASE power variation of the backward traveling ASE signals corresponding to the input optical signals with different input powers of +6, 0 and −6 dBm. Furthermore, a curve 32 almost overlapping to the curve 25 indicates an ASE power variation of a backward traveling ASE signal when the pump power of the forward pump lasers 12 and the forward pump laser 32 are controlled such that the backward ASE powers of the backward traveling C-band ASE signal is constant. Accordingly, the two stage optical amplifier 110 can amplify the input optical signals at a constant gain without changing the gain response of the amplifier with respect to the wavelength, by the feedback gain control operation for maintaining the ASE power of the backward traveling ASE signals at the predetermined power level. In addition, the optical noise figure ($NF_{total}$) is given by the following equation.

$$NF_{total} = NF_1 + (1/G_1) NF_2 \quad (1)$$

Here, $NF_1$ is an optical noise figure of the optical amplifier 30, $NF_2$ is an optical noise figure of the optical amplifier 10, and $G_1$ is the gain of the optical amplifier 30.

For example, assuming that the optical amplifier 30 having a noise figure NF of 4 dB and a gain of 10 dB is used, and the optical amplifier 10 having a noise figure $NF_2$ of 8 dB is used. The two-stage optical amplifier 110 comprising the optical amplifiers 10 and 30 can realize the low noise figure of 5 dB.

C. Third embodiment of the invention

Figure 9:
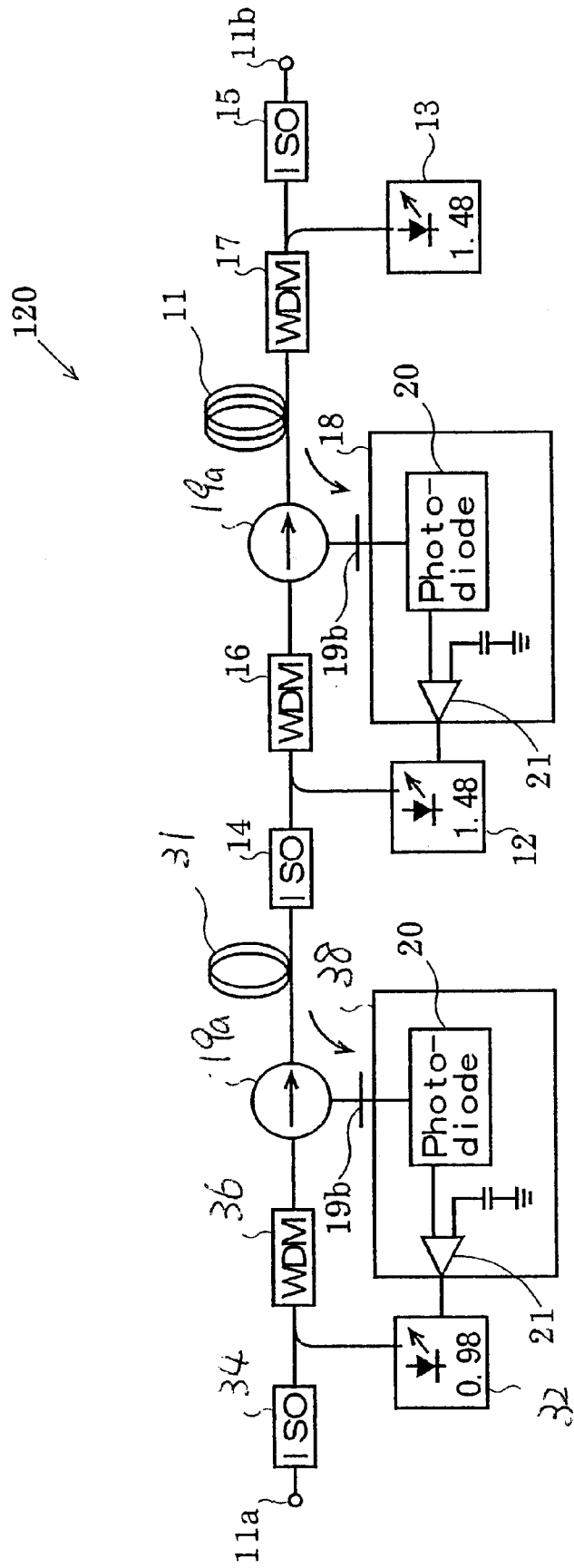
FIG. 9 is a simplified block diagram of a two stage optical amplifier in accordance with the third embodiment of the invention.

In the first and second embodiments, the monitoring WDM 19 or 39 has been used as an extracting means to extract the backward traveling ASE signals from the optical fiber 11 or 31. However, as shown in FIG. 9, it is possible to alter the monitoring WDM 19 to the combination of a circulator 19a and a filter 19b. The circulator 19a leads to the controller 18 optical components (including the backward traveling ASE signal) that propagate in the opposite direction of the input optical signals. The filter 19b then passes the desired wavelength band including the backward traveling ASE signal and rejects the undesired wavelength band including the input optical signals.

Although the input optical signals are in the L-band wavelength (1570–1600 nm) and the monitor signal is in the C-band wavelength (1530–1560 nm), the combination of two types of wavelengths can be changed suitably.

The backward pump laser 13 is not always required to the optical amplifiers 10, 110 and 120.

Referring to the feedback control operation of the optical amplifier 110, since the gain characteristics of a two stage optical amplifier 110 are determined principally by the second optical amplifier 10, pump power control of the first stage amplifier 30 is not always required. In this instance, the forward pump laser 32 then provides a constant pump signal to the single erbium doped fiber, at a predetermined constant power.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. An optical amplifier for amplifying an optical signal, which comprises:
    an input port for inputting the optical signal,
    a rare earth doped optical fiber, coupled to said input port, for amplifying the optical signal,
    a forward pump laser, coupled to said rare earth doped optical fiber, for providing a forward pump signal to said rare earth doped optical fiber in a co-propagating direction with respect to said optical signal,
    a wavelength division multiplexer, coupled between said input port and said rare earth doped optical fiber, for extracting a backward amplified spontaneous emission signal in a first wavelength band differing from a second wavelength band containing the optical signal,
    a gain controller for controlling a pump power of the forward pump signal based on a received power of the backward spontaneous emission signal, and
    an output port for outputting the amplified optical signal.

2. An optical amplifier according to claim 1, wherein said rare earth doped optical fiber is doped with erbium and further co-doped with aluminum.

3. An optical amplifier according to claim 1, wherein said forward pump laser is operable to change the power level of the forward pump signal in response to a bias current, and said gain controller comprises:
    a photo diode for performing a photoelectric conversion of the backward traveling amplified spontaneous emission signal, and
    a controller for controlling the bias current of said forward pump laser by comparing the received power of the backward traveling amplified spontaneous emission signal with a predetermined power level.

4. An optical amplifier according to claim 1, wherein a wavelength band of the forward pump signal is approximately 1480 nm.

5. An optical amplifier according to claim 1, wherein the first wavelength band is approximately 1530 nm.

6. An optical amplifier according to claim 1, further comprising a first optical isolator coupled between said input port and said wavelength division multiplexer and a second optical isolator coupled between said rare earth doped optical fiber and said output port.

7. An optical amplifier for amplifying an optical signal, which comprises:
    an input port for inputting the optical signal,
    a rare earth optical fiber, coupled to said input port, for amplifying the optical signal,
    a forward pump laser, coupled to said rare earth doped optical fiber, for providing a forward pump signal to said rare earth doped optical fiber in a co-propagating direction with respect to said optical signal,
    a wavelength division multiplexer, coupled between said input port and said rare earth doped optical fiber, for extracting a backward amplified spontaneous emission signal in a first wavelength band differing from a second wavelength band containing the optical signal,
    a gain controller for controlling a pump power of the forward pump signal based on a received power of the backward spontaneous emission signal,
    an output port for outputting the amplified optical signal, and
    a backward pump laser, coupled to said rare earth doped optical fiber, for providing a backward pump signal to said rare earth doped optical fiber in a counter-propagating direction relative to said optical signal.

8. An optical amplifier according to claim 7, wherein said backward pump laser outputs the backward pump signal at a predetermined constant power.

9. An optical amplifier according to claim 8, wherein a wavelength band of the backward pump signal is approximately 1480 nm.

10. A two stage optical amplifier for amplifying an optical signal, which comprises:
    an input port for inputting the optical signal,
    a first rare earth doped optical fiber, coupled to said input port, for amplifying the optical signal,
    a first forward pump laser, coupled to said first rare earth doped optical fiber, for providing a first forward pump signal to said first rare earth doped optical fiber in a co-propagating direction with respect to said optical signal,
    a first wavelength division multiplexer, coupled between said input port and said first rare earth doped optical fiber, for extracting a first backward amplified spontaneous emission signal in a first wavelength band differing from a second wavelength band containing the optical signal,
    a first gain controller for controlling a first pump power level of the first forward pump signal based on a first received power of the first backward amplified spontaneous emission signal,
    an optical isolator coupled to said first rare earth doped optical fiber,
    a second rare earth doped optical fiber, coupled to said optical isolator, for amplifying the optical signal,
    a second forward pump laser, coupled to said second rare earth doped optical fiber, for providing a second forward pump signal to said second rare earth doped optical fiber in a co-propagating direction with respect to said optical signal,
    a second wavelength division multiplexer, coupled between said optical isolator and said second rare earth doped optical fiber, for extracting a second backward amplified spontaneous emission signal in the first wavelength band differing from the second wavelength band containing the optical signal,
    a second gain controller for controlling a second pump power level of the second forward pump signal based on a second received power of the second backward amplified spontaneous emission signal, and an output port, coupled to said second rare earth doped optical fiber, for outputting the amplified optical signal.

11. An optical amplifier according to claim 10, wherein said first and second rare earth doped optical fibers are doped with erbium and further co-doped with aluminum.

12. An optical amplifier according to claim 10, wherein said first and second forward pump lasers are operable to change the first and second pump power levels of the first and second forward pump signals in response to respective bias currents, said first gain controller comprising:

a first photo diode for performing a photoelectric conversion for the first backward amplified spontaneous emission signal, and a first controller for controlling the bias current of said first forward pump laser by comparing the first received power of the first backward amplified spontaneous emission signal with a first predetermined power level, and said second gain controller comprising:

a second photo diode for performing a photoelectric conversion for the second backward amplified spontaneous emission signal, and a second controller for controlling the bias current of said second forward pump laser by comparing the second received power of the second backward amplified spontaneous emission signal with a second predetermined power level.

13. An optical amplifier according to claim 10, wherein a wavelength of the first forward pump signal is 980 nm, and a wavelength of the second forward pump signal is approximately 1480 nm.

14. An optical amplifier according to claim 10, wherein wavelengths of the first and second wavelength bands are both approximately 1530 nm.

15. An optical amplifier according to claim 10, further comprising a second optical isolator coupled between said input port and said first wavelength division multiplexer, and a third optical isolator coupled between said second rare earth doped optical fiber and said output port.

16. An optical amplifier according to claim 10, further comprising a backward pump laser, coupled to said second rare earth doped optical fiber, for providing a backward pump signal to said rare earth doped optical fiber in a counter-propagating direction relative to said optical signal.

17. An optical amplifier according to claim 16, wherein said backward pump laser outputs the backward pump signal at a predetermined constant power.

18. An optical amplifier according to claim 16, wherein a wavelength of the backward pump signal is approximately 1480 nm.

19. A method for controlling gain of an optical amplifier comprising a rare earth doped optical fiber for amplifying an optical signal, comprising the steps of:

providing a pump signal to the rare earth doped optical fiber, inputting the optical signal in a first wavelength band to the rare earth doped optical fiber, extracting a backward amplified spontaneous emission signal in a second wavelength band differing from the first wavelength band, measuring a received power of the backward amplified spontaneous emission signal, and controlling a pump power of the pump signal based on a difference between the received power and a predetermined power level to keep the backward amplified spontaneous emission signal at a constant power level.

20. A method of controlling a gain of the optical amplifier according to claim 19, wherein said optical signal is in the L-band wavelength from 1565 nm to 1610 nm, and the backward amplified spontaneous emission signal is approximately 1530 nm.

* * * * *